United States Patent [19]

Kondziola

[11] 3,948,460

[45] Apr. 6, 1976

[54] PENDULUM SUPPORT FOR A SEAT BELT RETRACTOR

[75] Inventor: Joseph D. Kondziola, Royal Oak, Mich.

[73] Assignee: General Motors Corporation, Detroit, Mich.

[22] Filed: Mar. 28, 1975

[21] Appl. No.: 563,099

[52] U.S. Cl............................................ 242/107.4 A
[51] Int. Cl.²................... A62B 35/02; B65H 75/48
[58] Field of Search............. 242/107.4 R, 107.4 A; 280/150 SB; 397/388

[56] References Cited
UNITED STATES PATENTS

| | | | |
|---|---|---|---|
| 3,489,367 | 1/1970 | Kovacs et al. | 242/107.4 A |
| 3,831,878 | 8/1974 | Griffin | 242/107.4 A |

*Primary Examiner*—Stanley N. Gilreath
*Assistant Examiner*—John M. Jillions
*Attorney, Agent, or Firm*—C. E. Leahy

[57] ABSTRACT

A pendulum support for the pendulum of a vehicle inertia responsive seat belt retractor. The pendulum support includes laterally spaced side walls juxtaposed to the spaced side walls of the retractor housing, and an integral pendulum support portion extending between the side walls and mounting an inertia actuated pendulum. Integral apertured bushing portions on the side walls of the support member encircle the shaft of the belt reel. These bushing portions are journalled in apertures in the side walls of the housing to mount the belt reel shaft on the housing for rotation relative thereto and also to mount the pendulum support portion and the pendulum on the housing at a predetermined consistent radial distance relative the reel shaft. The support is anchored against rotary movement about the reel shaft by providing elongated apertures in the side walls thereof which receive the pivot shaft of a locking bar for the belt reel. This also fixes the position of the pendulum support portion and pendulum relative to the locking bar which is engaged by the pendulum under inertia forces to move the locking bar into engagement with the belt reel and block unwinding rotation of the reel.

3 Claims, 4 Drawing Figures

PENDULUM SUPPORT FOR A SEAT BELT RETRACTOR

The invention relates generally to inertia type seat belt retractors and more particularly to an improved support for the inertia members of such retractors.

Vehicle occupant restraint belt retractors have heretofore been provided with an inertia responsive pendulum for moving a locking bar between a detenting position blocking unwinding rotation of the belt reel and an undetenting position permitting free rotation. The belt reel shaft is journalled for rotation on the side walls of the retractor housing, and the locking bar is likewise pivotally supported on the housing side walls by a pivot shaft. The pendulum is supported by a pendulum support member which also has its ends suitably mounted on the housing side walls. The mountings of the reel shaft, the locking bar pivot shaft, and the pendulum support member are closely controlled to provide a consistent dimensional relationship therebetween assuring desired functioning of the inertia lock in response to vehicle acceleration and deceleration. In the alternative, it is known to provide an adjusting device on the locking bar by which the location of the locking bar relative the pendulum may be adjusted to provide the proper dimensional relationship between the reel shaft, the locking bar and the pendulum. It is also known that ball type inertia sensors or other inertia responsive devices may be employed in occupant restraint belt retractors.

The present invention provides a support which assures predeterminedly consistent locational relationship of the pendulum or other inertia member relative the locking bar and the belt reel.

According to this invention, a support has laterally spaced side walls which are juxtaposed to the walls of the housing. Integral bushing portions on each side wall of the support encircle the shaft of the belt reel and extend laterally of the side walls into apertures in the walls of the housing to journal the reel shaft for rotation relative the housing. Elongated apertures in the side walls of the support slidably receive the pivot shaft of the locking bar to prevent rotation of the support about the pivot shaft and fix the location of the support relative the locking bar. The support has a pendulum support portion integral with the side walls of the support member and bridging the lateral space therebetween. The pendulum mounted by the pendulum support portion of the support is thereby located at a predeterminedly consistent location relative the reel shaft and the locking bar.

Thus, one feature of the invention is that the support mounts the pendulum or other inertia member at a predetermined consistent location relative the axis of rotation of the belt reel shaft.

Another feature of the invention is that the support mounts the pendulum or other inertia member at a predeterminedly consistent location relative the reel shaft and the locking bar.

These and other features, objects and advantages of the invention will become apparent upon consideration of the specification and the appended drawings in which.

Figure 1:
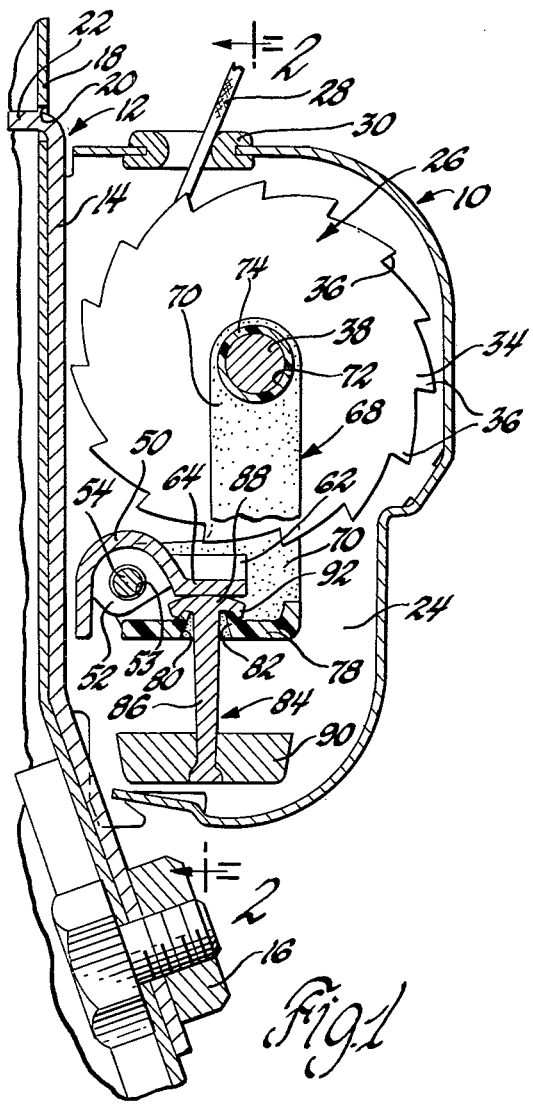
FIG. 1 is a sectional view through a vehicle body having a seat belt retractor embodying a pendulum support according to the invention and having parts broken away.
Figure 2:
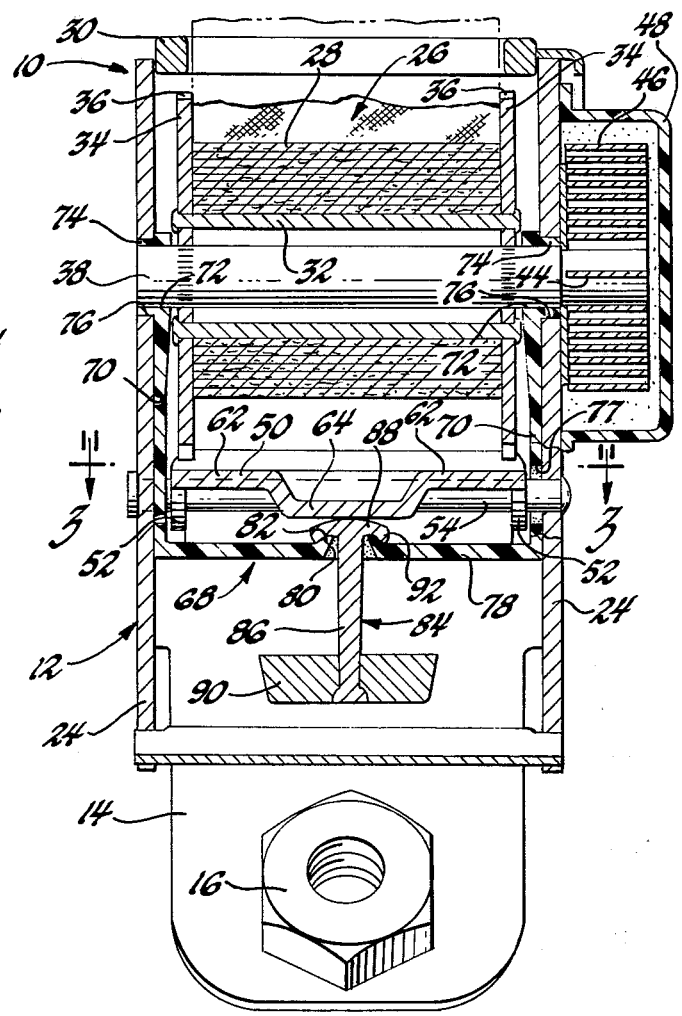
FIG. 2 is a sectional view taken in the direction of arrows 2—2 of FIG. 1.

Referring to FIGS. 1 and 2 of the drawings, a vehicle occupant restraint belt retractor is generally indicated by 10 and includes a metal retractor housing generally designated by 12. The housing 12 includes a base wall 14 having a weld nut 16 that permits a threaded bolt, not shown, to secure the lower end of the retractor to a vehicle body support member 18. The upper end of the support member 18 defines an aperture 20 that receives a positioning flange 22 of the retractor housing 12 to complete the securement and positioning of the retractor 10. The retractor housing 12 also includes spaced parallel side walls 24 that are formed integral with the base wall 14. A belt reel designated generally by 26 is rotatably mounted between the side walls 24 of the retractor housing 12 and receives a belt 28 that extends upwardly through a belt guide 30 on the upper side of the retractor. The belt 28 thus extends outwardly for positioning across the vehicle occupant to provide a restraining function in the conventional manner.

The belt reel 26 of retractor 10 includes an elongated belt drum 32 on which the belt 28 is wound and which extends between ratchet plates 34 on the opposite sides of the belt. The ratchet plates 34 are suitably fixed to the opposite sides of the belt drum 32 and have ratchet teeth 36 that face in the belt unwinding direction of reel rotation. An elongated reel shaft 38 is received by the belt drum 32 and suitably fixed to the ratchet plates 34 such as by splining. The ends of the reel shaft 38 are rotatably supported on the housing side walls 24 in a manner which will be fully described hereinafter. The FIG. 2 right-hand end of the reel shaft 38 extends outwardly through the adjacent housing wall 24 and has a slot which receives the inner end 44 of a spiral or clock spring 46. The outer end of the spring, not shown, is suitably fixed to the adjacent housing side wall 24 so that the belt reel 26 is normally biased in a belt winding direction to store the belt 28 on the belt reel 26. A cover 48 is attached to the side walls 24 and conceals the spring 46.

A locking bar 50 is pivotally mounted on the side walls 24 of the housing 12 for selective movement into locking engagement with the ratchet teeth 36 of the ratchet plates 34. The locking bar 50 is preferably a metal stamping and has integral downwardly bent tabs 52 which have apertures 53 to receive a pivot shaft 54. The pivot shaft 54 extends through apertures 55 in the side walls 24 of the housing 12 and is retained therein by a head 56 at the one end of the pivot shaft 54 and having its other end 58 staked or pressed to the side walls 24.

Figure 3:
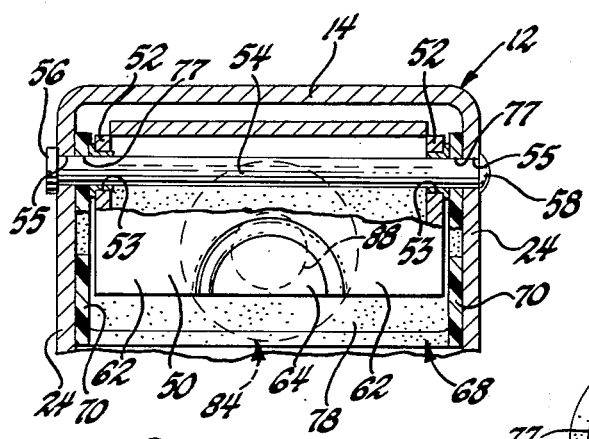
FIG. 3 is a sectional view taken in the direction of arrows 3—3 of FIG. 2.

Flanged bushings 55, as shown in FIG. 3, are preferably located in the apertures 53 of the locking bar tabs 52 and encircle the pivot shaft 54 to reduce friction between the pivot shaft 54 and the locking bar tabs 52, thereby assuring freedom of pivotal movement of the locking bar.

The locking bar 50 also has locking tangs 62 which are aligned with the ratchet teeth 36 of the ratchet plates 34 for engagement with the ratchet teeth 36 when the locking bar 50 is pivoted upwardly about the pivot shaft 54. The locking bar 50 also has a downwardly stamped control portion 64 intermediate the locking tangs 62 for engaging a pendulum as will be described hereinafter.

According to this invention, a pendulum support 68 is preferably of an injection molded plastic and includes laterally spaced side walls 70 which are juxtaposed to the side walls 24 of the retractor housing 12. The upper ends of the side walls 70 extend between the side walls 24 and the ratchet plates 34 and have apertures 72 which receive the ends of the reel shaft 38. Bushing portions 74 are integral with the side walls 70 and extend laterally outwardly into apertures 76 of the side walls 24. The bushing portions 74 thus journal the reel shaft 38 for rotation relative the housing 12.

Figure 4:
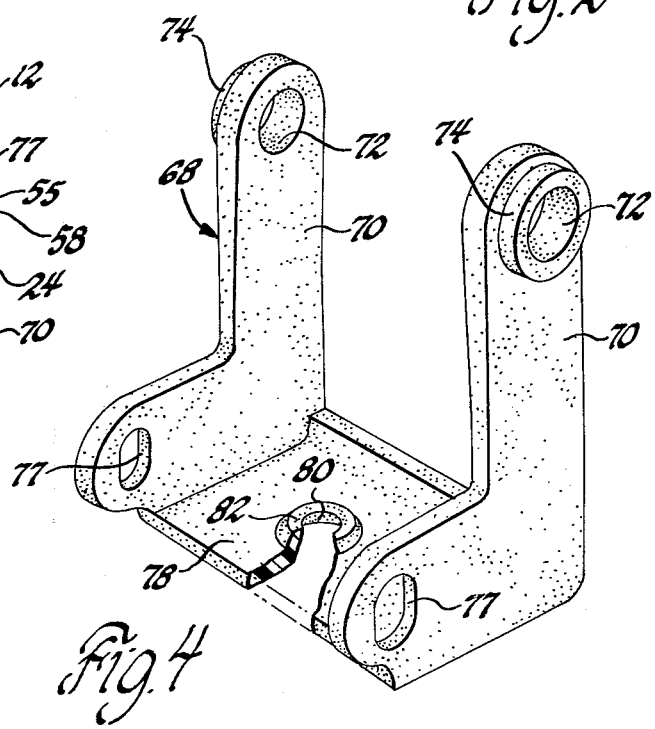
FIG. 4 is a perspective view of the pendulum support.

As best seen in FIGS. 3 and 4, the lower end of the side walls 70 have elongated apertures 77 which slidably receive the locking bar pivot shaft 54 so as to fix the pendulum support 68 against rotation relative the reel shaft 38. The apertures 77 are elongated in their vertical dimension as shown in FIG. 4 to facilitate insertion of the locking bar pivot shaft 54 during assembly of the retractor. The apertures 77 are closely sized to the diameter of the locking bar pivot shaft 54 in the horizontal direction so that the support 68 is fixed against rotation relative the locking bar pivot shaft 54. Alternate means for fixing the pendulum support against rotation such as tabs on the support member engaged in apertures in the housing side wall may be provided.

The pendulum support 68 also includes a pendulum support portion 78 which is integral with the side walls 70 and bridges the lateral space between the side walls 70. The pendulum support portion 78 has a central aperture 80 and an upstanding lip 82 which surrounds the aperture 80.

A pendulum generally indicated at 84 has a stem 86 which extends through the aperture 80 and mushrooms outwardly above the pendulum support portion 78 to provide a control portion 88. A weight 90 is staked to the lower end of the stem 86. The control portion 88 has a downwardly extending peripheral lip 92 which cooperates with the lip 82 of the pendulum support portion 78 to support the pendulum 84. The upper side of the pendulum control portion 88 is engaged by the control portion 64 of the locking bar 50.

The pendulum 84 swings from its vertically depending orientation of FIGS. 1 and 2 to an inclined position in response to predetermined changes in vehicle acceleration or deceleration in any horizontal direction. This pendulum swinging causes the pendulum control portion 88 to pivot the locking bar 50 upwardly so that the locking bar tangs 62 engage ratchet teeth 36 to block unwinding rotation of the belt reel 26. When the vehicle acceleration or deceleration is terminated, gravity returns the pendulum 84 to its vertical position and likewise allows pivoting of the locking bar 50 downwardly out of engagement with the ratchet teeth 36 so that belt unwinding is permitted.

It will be apparent that the pendulum support 68 could be used to mount a ball type inertia sensor or the equivalent as taught by the prior art instead of the pendulum 84 as shown in the drawings.

Thus, it is seen that the invention provides an improved support for the inertia member of a vehicle inertia sensor which locates the inertia member at a predeterminedly consistent fixed location relative the reel shaft and the locking bar pivot shaft. The pendulum support includes laterally spaced side walls juxtaposed to the spaced side walls of the retractor housing, and an integral pendulum support portion extending between the side walls and mounting an inertia actuated pendulum. Integral apertured bushing portions on the side walls of the support member encircle the shaft of the belt reel. These bushing portions are journalled in apertures in the side walls of the housing to mount the belt reel shaft on the housing for rotation relative thereto and also to mount the pendulum support portion and the pendulum on the housing at a predetermined consistent radial distance relative the reel shaft. The support is anchored against rotary movement about the reel shaft by providing elongated apertures in the side walls thereof which receive the pivot shaft of a locking bar for the belt reel. This also fixes the position of the pendulum support portion and pendulum relative to the locking bar which is engaged by the pendulum under inertia forces to move the locking bar into engagement with the belt reel and block unwinding rotation of the reel.

The embodiments of the invention in which an exclusive property or privilege is claimed are defined as follows:

1. In a vehicle inertia responsive seat belt retractor having a housing, a belt reel having a reel shaft mounting the reel on the housing for belt winding and unwinding reel rotation, a locking bar, pivot means mounting the locking bar on the housing for movement between an undetenting position permitting rotation of the belt reel, a detenting position blocking rotation of the belt reel, and an inertia responsive member for moving the locking bar between undetenting and detenting positions, a support member for mounting the inertia responsive member comprising: laterally spaced side walls juxtaposed to the walls of the housing, first mounting means on the side walls of the support member to mount the support member on said reel shaft, second mounting means on the side walls of the support member to mount the support member on the locking bar pivot means, and an inertia member support portion integral with the side walls of the support member and bridging the lateral space therebetween, the inertia member support portion having means located at a predetermined location with respect to the first and second mounting means for mounting the inertia responsive member at a predetermined location relative the reel shaft and the locking bar.

2. In a vehicle inertia responsive seat belt retractor having a housing with laterally spaced walls, a belt reel having a reel shaft for mounting the reel on the housing for belt winding and unwinding reel rotation, a locking bar, pivot means mounting the locking bar on the housing for movement between an undetenting position permitting rotation of the belt reel and a detenting position blocking rotation of the belt reel, and an inertia responsive member for moving the locking bar between undetenting and detenting positions, the improvement comprising: a support member for mounting the inertia responsive member at a predeterminedly consistent mounting location relative the reel shaft, the support member having laterally spaced side walls, said side walls having apertures which receive the reel shaft to mount the support member on the housing, mounting means acting between the support member and the housing to prevent rotary movement of the support member about the reel shaft, and an inertia member support portion integral with the side walls of the support member and bridging the lateral space therebetween, the inertia member support portion having means located at a predetermined location with respect to the apertures receiving the reel shaft for mounting the inertia responsive member at a predetermined location relative the reel shaft.

3. A vehicle inertia responsive seat belt retractor comprising: a housing having laterally spaced walls, a belt reel having a reel shaft mounting the belt reel on the housing walls for belt winding and unwinding reel rotation, a locking bar, a support member having laterally spaced side walls juxtaposed to the walls of the housing, an aperture in each side wall of the support member receiving the reel shaft to mount the support member on the housing at a location fixed relative the reel shaft, integral bushing portions on each side wall encircling the reel shaft and extending laterally between the reel shaft and the housing wall to journal the reel shaft for rotation on the housing, a locking bar, a pivot shaft extending between the walls of the housing to mount the locking bar for pivotal movement between an undetenting position permitting rotation of the reel and a detenting position blocking rotation of the reel, an aperture in each side wall of the support member for receiving the pivot shaft to mount the support member on the housing and relative the locking bar, the support member having a pendulum support portion integral with the side walls of the support member and bridging the lateral space therebetween, and a pendulum mounted by the pendulum support portion of the support member at a predetermined location relative the reel shaft and the locking bar.

* * * * *